(12) United States Patent
Baird

(10) Patent No.: US 8,090,744 B1
(45) Date of Patent: Jan. 3, 2012

(54) METHOD AND APPARATUS FOR DETERMINING COMPATIBILITY BETWEEN A VIRTUALIZED APPLICATION AND A BASE ENVIRONMENT

(75) Inventor: Bradley Baird, Orem, UT (US)

(73) Assignee: Symantec Operating Corporation, Mountain View, CA (US)

( * ) Notice: Subject to any disclaimer, the term of this patent is extended or adjusted under 35 U.S.C. 154(b) by 309 days.

(21) Appl. No.: 12/548,159

(22) Filed: Aug. 26, 2009

(51) Int. Cl.
G06F 7/00 (2006.01)
G06F 17/30 (2006.01)

(52) U.S. Cl. .................................. 707/791; 707/802

(58) Field of Classification Search .................. None
See application file for complete search history.

(56) References Cited

U.S. PATENT DOCUMENTS

| | | |
|---|---|---|
| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |
| 5,978,788 A | 11/1999 | Castelli et al. |
| 5,978,791 A | 11/1999 | Farber et al. |
| 6,003,087 A | 12/1999 | Housel, III et al. |
| 6,009,410 A | 12/1999 | LeMole et al. |
| 6,073,129 A | 6/2000 | Levine et al. |
| 6,088,524 A | 7/2000 | Levy et al. |
| 6,122,628 A | 9/2000 | Castelli et al. |

(Continued)

FOREIGN PATENT DOCUMENTS

WO WO97/00475 1/1997

(Continued)

OTHER PUBLICATIONS

Yang Yu, et al: "A Feather-weight Virtual Machine for Windows Applications"; Jun. 14, 2006; pp. 24-34.

(Continued)

Primary Examiner — Kuen Lu
Assistant Examiner — Tuan A Pham
(74) Attorney, Agent, or Firm — Rory D. Rankin; Meyertons, Hood, Kivlin, Kowert & Goetzel

(57) ABSTRACT

A system and method for determining whether one or more applications in a virtual software layer and one or more applications in a base environment are compatible. The method includes intercepting an access attempt from an application on a computer system to a file on the computer system, such as a system file. The system then determines a first compatibility checking mode and whether a second version of the file exists in a virtual software layer. In response to these determinations and to intercepting the access attempt, the system attempts to perform the access using the second version of the file.

18 Claims, 7 Drawing Sheets

U.S. PATENT DOCUMENTS

| | | | |
|---|---|---|---|
| 6,311,221 B1 | 10/2001 | Raz et al. | |
| 6,938,042 B2* | 8/2005 | Aboulhosn et al. | 1/1 |
| 7,461,086 B1* | 12/2008 | Hurren et al. | 1/1 |
| 7,542,988 B1* | 6/2009 | Cook et al. | 1/1 |
| 7,735,057 B2 | 6/2010 | Rachman et al. | |
| 2003/0233490 A1* | 12/2003 | Blaser et al. | 709/328 |
| 2004/0230971 A1 | 11/2004 | Rachman et al. | |
| 2005/0120242 A1* | 6/2005 | Mayer et al. | 713/201 |
| 2007/0245409 A1* | 10/2007 | Harris et al. | 726/5 |
| 2008/0010630 A1 | 1/2008 | Ou-Yang et al. | |
| 2008/0098006 A1* | 4/2008 | Pedersen et al. | 707/10 |
| 2009/0113425 A1* | 4/2009 | Ports et al. | 718/1 |

FOREIGN PATENT DOCUMENTS

| | | |
|---|---|---|
| WO | WO97/46955 | 12/1997 |
| WO | WO98/11723 | 3/1998 |

OTHER PUBLICATIONS

Japanese Patent Application Laid-open No. Hei 10-133976.
Japanese Patent Application Laid-open No. Sho 64-36332.
Japanese Patent Application Laid-open No. Hei 10-162057.
G. Glass, "A Universal Streaming Service", C++ Report, Apr. 1996, pp. 74-76 and 81-83.
T. Ritchey, "Java!", New Riders Publishing, Dec. 1995, pp. 214-216.
Chen, Z. et al., (Dec. 11-14, 1995) "Real time video and audio in the world wide web" World Wide Web Journal, Fourth International World Wide Web Conference, pp. 333-348.
Jiang, Z. and Kleinrock, L. (1997) "Prefetching links on the WWW" IEEE International Conference on Communications (ICC), US, New York, NY: IEEE, pp. 483-489.
M. Schwartz, "Telecommunication Networks: Protocols, Modeling and Analysis", Jan. 1, 1987; Addison-Wesley Publishing Company, pp. 266-283.
J. Basu et al., "Degrees of Transaction Isolation in SQL *Cache: A Predicate-based Client-side Caching System", May 15, 1996, pp. 1-22.
Amit Shukla et al., "Storage Estimation for Multidimensional Aggregates in the Presence of Hierarchies", VLDB Conference Mumbai (Bombay), 1996, pp. 522-531.
Dale Skeen, "New Forms of Persistent Queries Are Necessary to Handle Live Business Data As It Speeds Through a Company", internet website www.byte.com Byte Magazine, Feb. 1998, 5pgs.
V. Hoff et al., "The Open Software Description Format (OSD)", internet website www.w3.org, Aug. 11, 1997, pp. 1-13.
Red Brick Vista, "Aggregate Computation and Management", internet website www.informix.com, printed Oct. 4, 2000.
Fireclick, "Web Site Performance is Key to E-Commerce Sucess", internet website WWW.Fireclick.com printed, Nov. 1, 2000.
Boost Web Optimizer Technology Overview, "How it Works", Sep. 27, 2000 and internet website www.boostworks.com printed Nov. 1, 2000.
"Delivering Windows to the Net White Paper", WinToNet by Menta Software, 2000 and Website http://216.205.21.102/ printed Nov. 1, 2000.
"First There was Streaming Audio, then Streaming Video. Now get ready for Streaming Software", Stream Theory White paper and Website WWW.Streamtheory.com printed Sep. 22, 2000.
"OSD Describing Software Package on the Internet", Marimba Inc. White paper 1998 and wedsite www.marimba.com, printed Nov. 1, 2000.
"Timbale for Windows Terminal Services" Marimba Promotional document, undated, 2000.
Japanese Patent Application Laid-open No. Hei 8-51596.
Japanese Patent Application Laid-open No. Hei 10-91446.
Japanese Patent Application Laid-open No. Hei 7-271603.
Japanese Patent Application Laid-open No. Hei 8-6878.

\* cited by examiner

METHOD AND APPARATUS FOR DETERMINING COMPATIBILITY BETWEEN A VIRTUALIZED APPLICATION AND A BASE ENVIRONMENT

BACKGROUND

Information technology infrastructure often plays a vital role in facilitating the efficient operation of modern organizations. For many organizations, such infrastructure extends beyond central servers and onto end-user systems. Administering and supporting IT infrastructure on a large number of end-user systems presents a significant challenge for IT managers. For example, with so many distributed systems, it may be slow and/or difficult to roll out new applications, update existing ones, and/or remove obsolete ones across an entire organization. Furthermore, without the ability to tightly control end-point environments, supporting and troubleshooting end-user systems may become extremely burdensome.

The problems of administering and supporting a large pool of end-user systems are further compounded because different applications installed on a given machine may potentially interfere with one another. For example, each application may rely on various different system files (e.g., dynamic link libraries or DLLs, drivers, configuration files, .sys files, etc.) and/or other settings, such as registry entries. Furthermore, different applications may rely on different versions of the system files and/or settings. In some instances, installing one application on a system may overwrite system files and/or setting relied on by other applications, thereby causing those applications to malfunction.

One approach to address the difficulties of administering a large number of end-user systems is endpoint software virtualization systems, such as Symantec Corporation's Workspace Virtualization Suite. Using such systems, an IT administrator may configure one or more virtual software layers (each containing any number of applications), and deploy those virtual software layers from a server to end-user systems in an automated fashion. In such systems, each virtual software layer may contain its own version of various system files and configuration settings, which may overlap in name and/or purpose with some of those already on the system or in other virtual layers. However, applications encapsulated in a virtual software layer may be configured to use system files and settings stored in the virtual layer rather than those stored on the actual machine (a.k.a., the base environment). For example, a file system filter driver may be configured to intercept system calls from virtualized applications and redirect those system calls to the corresponding system files of the virtual software layer.

By using virtual software layers, various applications can be encapsulated along with their corresponding system files and settings in respective virtual layers. Since system files that support various applications are kept separate from other system files (e.g., those on the base environment or in other virtual layers), application installations may be less likely to interfere with one another. For example, if installing a first application includes installing a new version of a DLL, then by deploying the application in a virtual layer, an administrator may ensure that the installation does not affect other applications that rely on the older version of the DLL.

In some cases, an IT administrator using the virtual software layer scheme described above may wish to move an application deployed in a virtual layer into the system's base environment. However, simply installing the application on the base environment may cause serious damage to the base environment and/or given system. For example, if the virtualization is effectively hiding system file conflicts between the virtualized application and an application in the base environment, then installing the (previously) virtualized application directly onto the base environment may result in over-writing some number of the base environment's system files and/or settings with those of the virtual layer, which may cause applications relying on those system files and/or settings to malfunction.

In view of the above, methods and mechanisms for determining compatibility between a virtualized application and base environment are desired.

SUMMARY

A system and method for determining whether one or more applications in a virtual software layer and one or more applications in a base environment are compatible. The method includes intercepting an access attempt from an application on a computer system to a file on the computer system, such as a system file. The system then determines a first compatibility checking mode and whether a second version of the file exists in a virtual software layer. In response to these determinations and to intercepting the access attempt, the system attempts to perform the access using the second version of the file.

In some embodiments, the system may determine a set of files of a plurality stored on the computer system, where for each file in the set, a second version of the file exists in the virtual software layer. In such embodiments, determining that the second version of the file exists may include determining that the file is a member of the set.

In some embodiments, the file and the second version of the file may have the same file name. In addition, the file system path of the file may be the same as the virtual path of the second version of the file.

In some embodiments, the application may exist in a second virtual software layer distinct from the virtual software layer.

In some embodiments, the system may detect that the access attempt failed and in response, record an indication of the failure in an error log in a persistent storage space.

In some embodiments, the access attempt may be performed by an automated test program configured to exercise a broad range of functionality provided by the application.

In some embodiments, the virtual application may be migrated, which may involve overwriting the file with the second version of the file.

In some embodiments, the system may be configured to intercept an access attempt from an application deployed in the virtual software layer to the second version of the file on the computer system. The system may also determine a second compatibility mode and that the file exists outside of the virtual software layer. In response to the interception and two determinations, the system may attempt to perform the access using the file.

Figure 1:
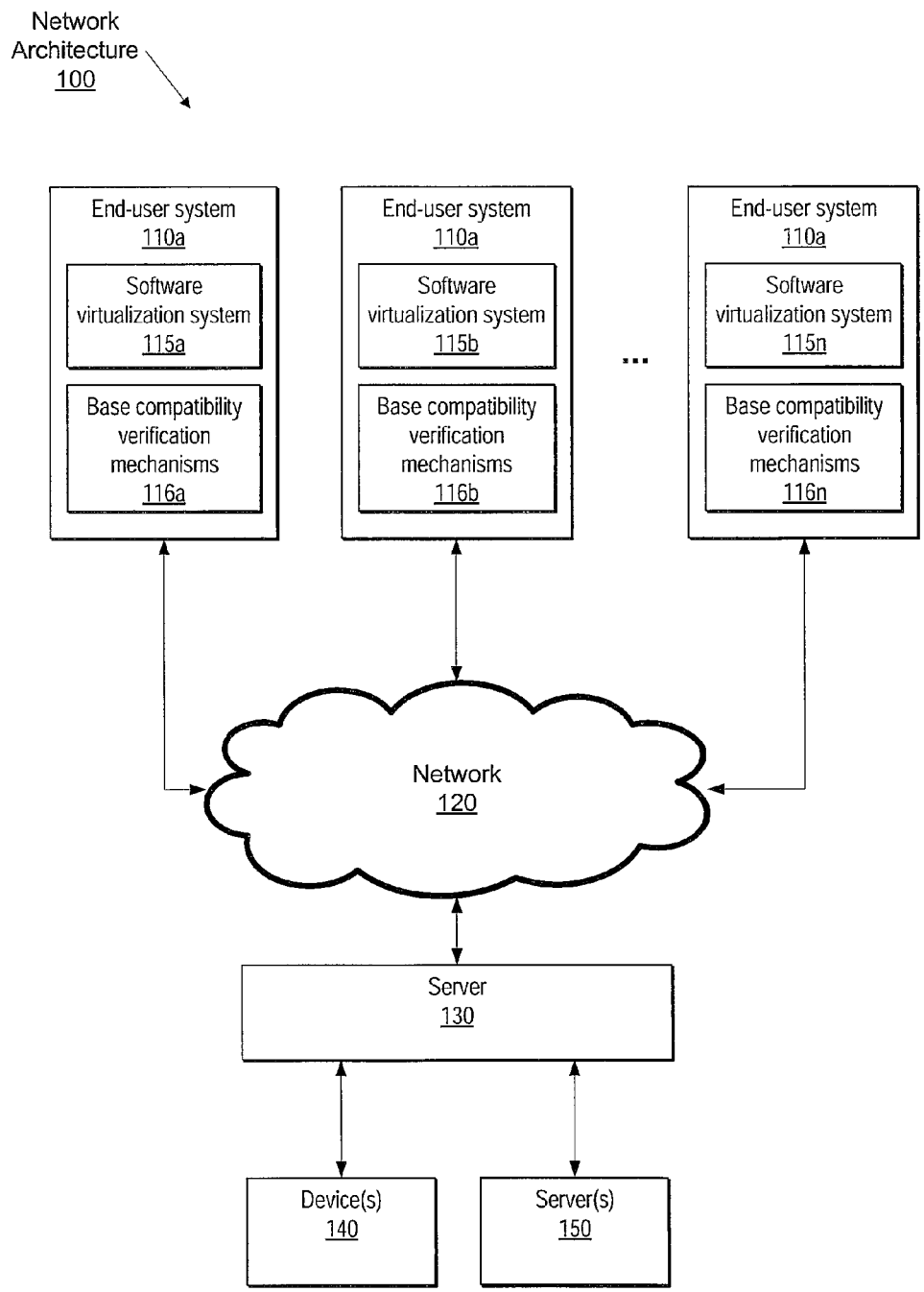
FIG. 1 is a block diagram illustrating a network architecture for administering multiple end-user systems configured to employ virtual software layers with base compatibility checking, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Migrating an application from a virtual software layer to a system's base computing environment may involve overwriting and/or otherwise modifying any number of files (e.g., shared system files) and/or settings. As a result, any number of applications that are dependent on the overwritten files/settings may consequently malfunction.

According to various embodiments, base environment compatibility verification mechanisms may be provided for determining the compatibility of a virtual application (i.e., an application installed in a virtual software layer) with a base environment, without the need to actually install the application onto the base system. Thus, potential conflicts may be detected and corrected before an administrator attempts to install a new application on the base environment.

As used herein, the term base environment may refer to a system's non-virtualized software environment, including any installed applications, system files, and/or settings. An application may be said to be compatible with the base environment if installing the application on the base environment would not cause any of the applications of the base environment, or the application itself, to malfunction (e.g., the installation of a new application replacing a system file relied upon by another application with an incompatible version may cause such a malfunction).

In addition, as used herein, the term system file may refer to any file or setting providing program functionality and/or configuration information in support of a plurality of applications installed on the system. For example, in a Microsoft Windows® operating system, examples of system files may include dynamic link libraries (DLLs), .sys files, drivers, configuration files, and/or other files. The term system file may also be used to refer to various configuration settings, such as registry settings in Microsoft's Windows® operating system. In various embodiments, a system file may be identified as one that is installed into operating system storage space (e.g., the "Windows" directory in Microsoft Windows®) rather than into an application's directory.

FIG. 1 is a block diagram illustrating a network architecture for administering multiple end-user systems configured to employ virtual software layers with base compatibility checking, according to some embodiments. In the illustrated embodiment, network architecture 100 comprises a plurality of end-user systems 110a-110n. For example, in some embodiments, each end-user system may be a desktop computer, terminal, laptop computer, or other computing environment.

According to the illustrated embodiment, the end user systems 110a-110n are coupled to server 130 via network 120. In various embodiments, network 120 may be a local area network (e.g., an intranet), a wide area network (e.g., Internet), or any combination thereof that is usable to communicate between server 130 and end-user systems 110a-110n. In one embodiment, server 130 may correspond to a system such as Symantec's Notification Server™. Alternatively, server 130 can be any type of software distribution system, such as Microsoft's Systems Management Server, Avocent's LANDesk® Server Manager, or otherwise.

In the illustrated embodiment, server 130 is coupled to one or more devices 140, such as storage devices (e.g., RAID). Server 130 may also be coupled to one or more other servers 150, such as in a cluster arrangement. In some embodiments, server 130 may be usable by an IT administrator to configure various virtual software archives (VSAs), each containing one or more virtual applications and respective system files usable to support the operation of the virtual applications. In some embodiments, server 130 may further be usable by the IT administrator to deploy such a VSA to any of end-user systems 110a-110n, where it may be deployed as a virtual software layer.

According to the illustrated embodiment, each end-user system 110a-110n may comprise a software virtualization system 115a-115n, which may support the operation of virtual layers deployed on the respective end-user system. For example, software virtualization systems 115 may include virtual machines, virtual software packages, filter drivers, virtualization agents, configurations, and/or other modules that enable the deployment and operation of a virtual software layer. In addition, each end-user system 110 may include base compatibility verification mechanisms 116, which may enable a user to determine whether a virtual application is compatible with the base environment installed on the respective end-user system, as described herein.

Figure 2:
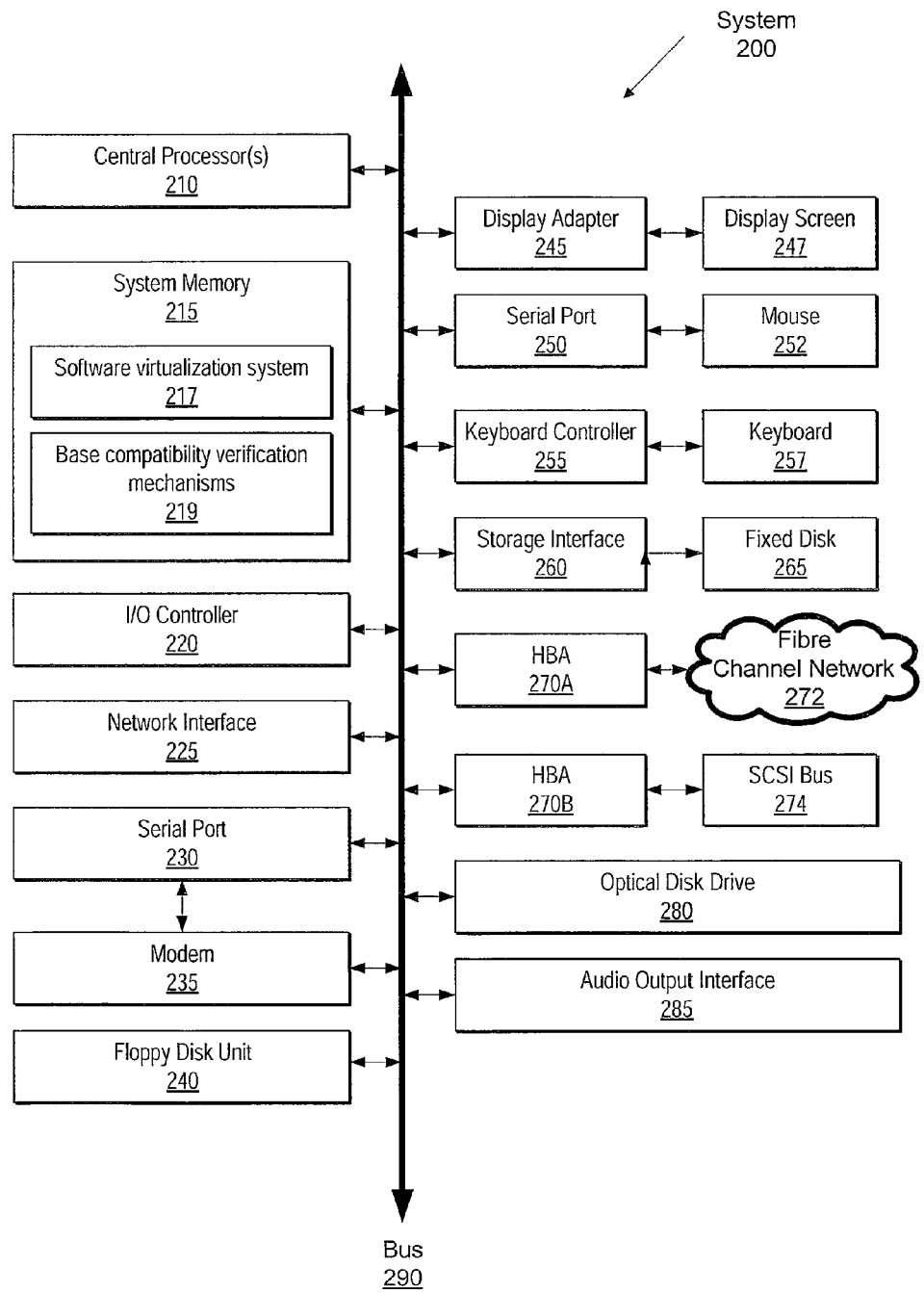
FIG. 2 depicts a block diagram of a computer system suitable for implementing an end-user system with base compatibility verification mechanisms.

FIG. 2 depicts a block diagram of a computer system 200 suitable for implementing an end-user system with base compatibility verification mechanisms, according to various embodiments. Computer system 200 includes a bus 290 which interconnects major subsystems of computer system 200, such as a central processor 210, a system memory 215 (typically RAM, but which may also include ROM, flash RAM, or the like), an input/output controller 220, an external audio device, such as a speaker system via an audio output interface 285, an external device, such as a display screen 247 via display adapter 245, serial ports 230 and 250, a keyboard 257 (interfaced with a keyboard controller 255), a storage interface 260, a floppy disk drive 240 operative to receive a floppy disk, a host bus adapter (HBA) interface card 270A operative to connect with a Fibre Channel network 272, a host bus adapter (HBA) interface card 270B operative to connect to a SCSI bus 274, and an optical disk drive 280 operative to receive an optical disk. The illustrated embodiment may also include a mouse 252 (or other point-and-click device, coupled to bus 290 via serial port 250), a modem 235 (coupled to bus 290 via serial port 230), and a network interface 225 (coupled directly to bus 290).

In some embodiments, bus 290 may allow data communication between central processor 210 and system memory 215, which may include read-only memory (ROM) or flash memory (neither shown), and random access memory (RAM) (not shown), as previously noted. The RAM may be the main memory into which the operating system and application programs are loaded. The ROM or flash memory can contain, among other code, the Basic Input-Output system (BIOS), which controls basic hardware operation such as the interaction with peripheral components. Applications resident with computer system 200 are generally stored on and accessed via a computer readable medium, such as a hard disk drive (e.g., fixed disk 265), an optical drive (e.g., optical drive 280), a floppy disk unit 240, or other storage medium. Additionally, applications can be in the form of electronic signals modulated in accordance with the application and data communication technology when accessed via network modem 235 or interface 225.

Storage interface 260, as with the other storage interfaces of computer system 200, can connect to a standard computer readable medium for storage and/or retrieval of information, such as a fixed disk drive 265. Fixed disk drive 265 may be a part of computer system 200 or may be separate and accessed through other interface systems. Modem 235 may provide a direct connection to a remote server via a telephone link or to the Internet via an internet service provider (ISP). Network interface 260 may provide a direct connection to a remote server via a direct network link to the Internet via a POP (point of presence). Network interface 225 may provide such connection using wireless techniques, including digital cellular telephone connection, Cellular Digital Packet Data (CDPD) connection, digital satellite data connection or the like.

Various other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application.

Code to implement various aspects of the present disclosure can be stored in computer-readable storage media such as one or more of system memory 215, fixed disk 265, optical disk 280, or floppy disk read by floppy disk unit 240. For example, system memory 215 may include software virtualization system 217, which may correspond to software virtualization systems 115 and facilitate the deployment and/or operation of virtual software layers. In some embodiments, system memory 215 may further comprise base compatibility verification mechanisms 219, which may correspond to mechanisms 115 of FIG. 1 and be usable to verify whether a virtual application is compatible with a base environment. In various embodiments, the operating system provided on computer system 200 may be any of various operating systems, including MS-DOS®, MS-WINDOWS®, OS/2®, UNIX®, Linux®, or another known operating system.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
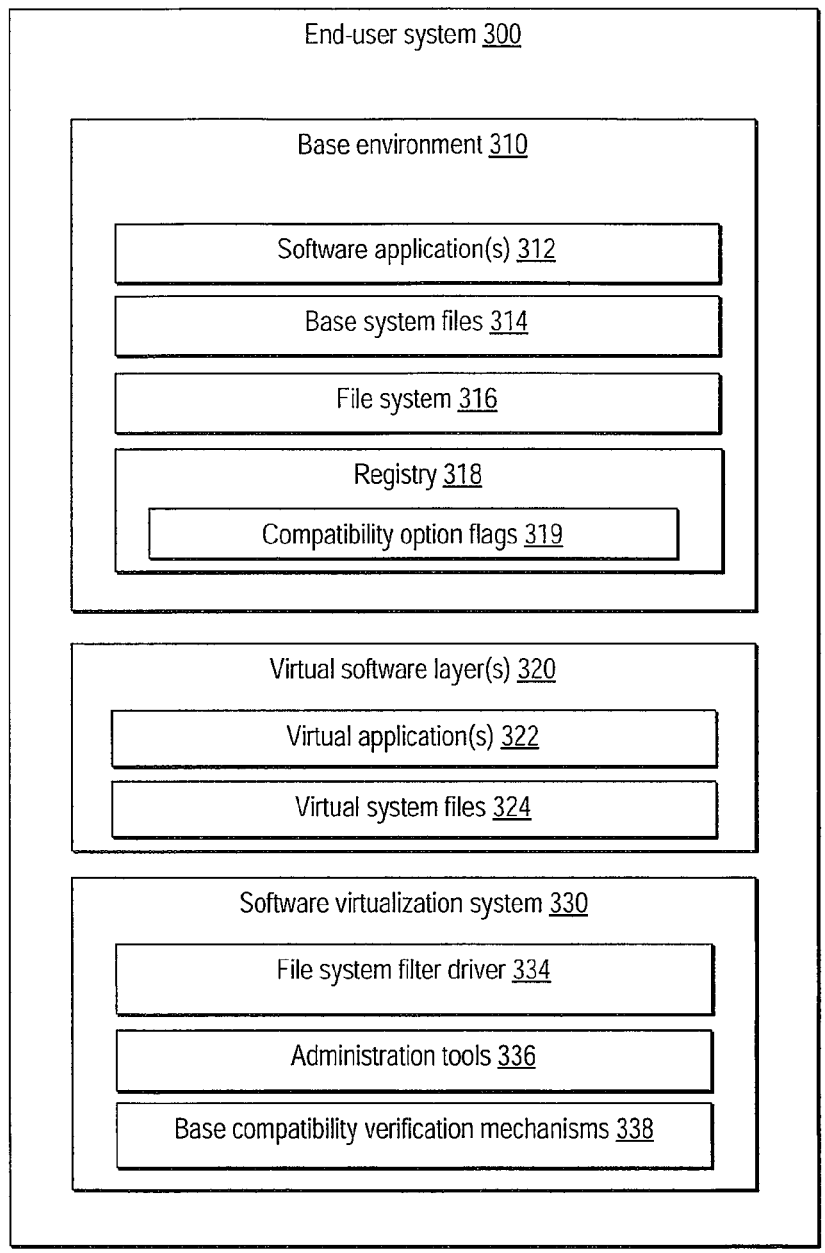
FIG. 3 is a block diagram illustrating various components of an end-user computer system configured to implement base environment compatibility verification, according to various embodiments.

FIG. 3 is a block diagram illustrating various components of an end-user computer system configured to implement base environment compatibility verification, according to various embodiments. According to the illustrated embodiment, end-user system 300 comprises a base environment 310. As described above, base environment 310 may include various components of the end-user system's software environment, including an operating system, a file system 316, installed software applications 312, base system files 314, and registry 318.

In some embodiments, file system 316 may comprise program instructions and data configured to segment system storage space into a plurality of files. Base system files 314 may include any number of files usable by applications 312 during operation, as previously described.

In some embodiments, registry 318 may be used for storing application settings and/or options, such as in the form of registry entries. For example, a registry may comprise a database containing information and settings for hardware, operating system software, non-operating system software, and/or per-use settings, etc. In some embodiments, a registry may be provided by an operating system, such as the Windows® registry provided by Microsoft Windows®. In some embodiments, registry 318 may include compatibility option flags 319, indicating various settings for the operation of base compatibility functions, such as those implemented by base compatibility determination mechanisms 338, as described below. As previously indicated, the term system files may be used herein to refer to both system files 316 and entries in registry 318. However, in FIG. 3, registry 318 is shown as a separate component from system files 314 for completeness.

In some embodiments, a base environment may be packaged as a single disk image and deployed by an IT administrator on various end-user systems to produce a pre-configured software environment.

According to the illustrated embodiment of FIG. 3, end-user system 300 may further include one or more virtual software layers 320. In some embodiments, each of virtual software layers 320 may comprise an isolated environment for executing one or more virtual applications 322 and various system files 324 (e.g., DLLs, registry entries, shared libraries, and/or other configuration files supporting the operation of virtual applications 322).

According to the illustrated embodiment, end-user system 300 may include software virtualization system 330, which may provide functionality for deploying, executing, and/or managing the operation of virtual software layers 320. For example, virtualization system 330 may be configured to deploy different virtual software layers such that system 300 appears to an end-user as containing the aggregate contents of the base environment plus that of the active virtual layers 320, including virtual system files 324.

In some embodiments, when a VSA is deployed onto end-user system 300, the contents of the VSA, including system files (e.g., files and registry settings) may be placed in a protected area in storage managed by file system 316. This area may be referred to as the redirection area. According to various embodiments, a software virtualization system, such as 330, may be configured to make the contents of the redirection area appear to the user as though they reside in the respective locations where a normal installation would have placed them. For example, while a program executable (e.g., firefox.exe from Mozilla™) may actually reside in a protected redirection area, the executable may be hidden from the users and instead displayed in the location where the user would normally see the executable if the program had been installed on the base environment (e.g., C:\Program Files\Mozilla Firefox\firefox.exe). The directory where a virtual file appears to the user may be referred to herein as the file's virtual path.

The layering functionality described above may be provided, at least in part, by file system filter driver 334. In some embodiments, filter driver 334 may be configured to intercept requests by applications (e.g., software applications 312 in base environment 310 and/or virtual applications 322 in a virtual software layer 320) to file system 316 and/or to registry 318, and to redirect the request to a base version or virtual version of the requested system file, as determined. In various embodiments, filter driver 334 may be configured to determine whether an application making a system call is in a virtual layer or in the base environment. In a normal mode of operation (as may be indicated by compatibility option flags 342), filter driver 334 may be configured to detect whether a virtual application is attempting to access a system file, and if so, to redirect the access to an appropriate virtual system 324 if one exists. For example, in some embodiments, if a virtual application attempts to access a virtual DLL, which appears to be residing on the base environment, the filter driver 334 may intercept the access attempt and redirect it to the actual location of the DLL in the redirection area.

In some embodiments, virtualization system 330 may include various administration tools 336, which may be used to add, remove, activate, deactivate, and/or otherwise manage the deployment of virtual software layers 320. In some embodiments, administration tools 336 may be configured to communicate with a central server (e.g., server 130 of FIG. 1). In such embodiments, administration tools 336 may be configured to receive new or updated virtual software packages from the server and in response, to deploy new virtual software layers as defined by those packages. In some embodiments, administration tools 336 may be responsive to communication from a server to remove, disable, and/or update various virtual software layers of 320.

In some embodiments, administration tools 336 may be usable to migrate a virtual application from a virtual software layer 320 to the base-environment. In some embodiments, this may include executing an installer program corresponding to a given virtual application. In other embodiments, migrating a virtual application to a base environment may include copying various virtual system files 324 from their respective layer and into the collection of system files 314 at respective locations on base environment 310. In various embodiments, software virtualization system 330 may include various base compatibility verification mechanisms 338 for determining whether a virtual application and supporting system files are compatible with a base environment before attempting to migrate the virtual application to the base environment.

Figure 4:
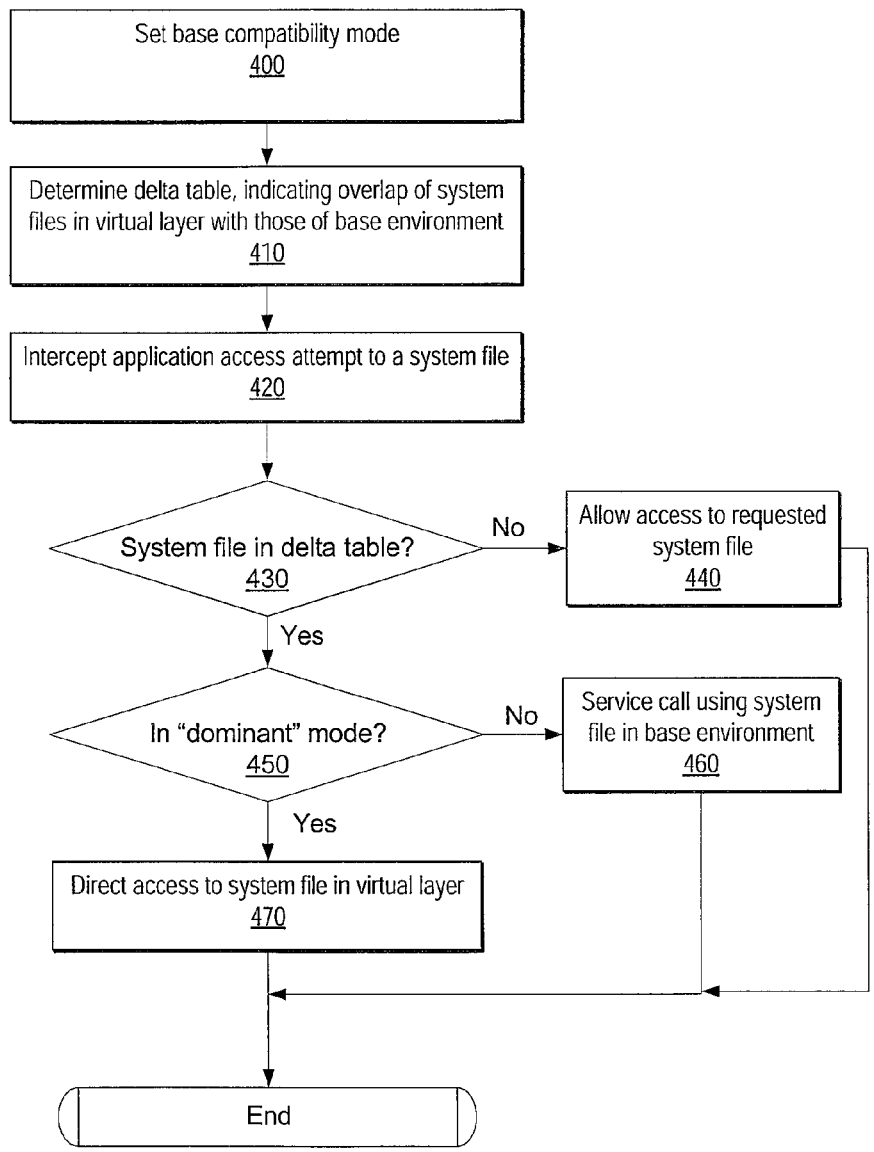
FIG. 4 is a block diagram illustrating a method for determining the compatibility of a virtual application with a base environment, according to some embodiments.

FIG. 4 is a block diagram illustrating a method for determining the compatibility of a virtual application with a base environment, according to some embodiments. According to the illustrated embodiment, the method of FIG. 4 may begin by setting a base compatibility mode, as in 400. In various embodiments, setting the base compatibility mode may comprise setting one or more flags in registry 318, such as compatibility option flags 319. In various embodiments, compatibility option flags may reside in registry 318 and/or in software virtualization system 330 itself.

Additionally, the base compatibility mode set in 400 may indicate several different modes. For example, one settable mode may indicate that the software virtualization system should operate in "normal" mode, as described above. Another settable mode may indicate that the software virtualization system should operate in "base compatibility" mode, indicating that a user is attempting to determine if a virtual application is compatible with the base environment. In some embodiments, if compatibility option flags 319 indicate that the virtualization system is in base compatibility mode, then one or more of option flags 319 may also indicate which virtual layers and/or applications are under test.

According to the illustrated embodiment, if the virtualization system determines that an application is under test, the virtualization system may compare the system files associated with the application and those that already exist on the base environment. In some embodiments, the virtualization system may record information indicating each virtual system file that shares a name and/or virtual path with a base system file. For example, in some embodiments, the virtualization system may record an indication of a file named "C:\Windows\foo.dll" if a virtual file by the same name ("foo.dll") and virtual path ("C:\Windows") exists in the virtual software layer. In some embodiments, the virtualization system may record the name, path, and/or other information regarding such files in a delta table, as in 410. In some embodiments, a system file name may be excluded from a delta table if the contents of the virtual version differ from the contents of the base version.

According to the illustrated embodiment, the file system filter may be configured to intercept access attempts to system files, as in 420. In some embodiments, in response to intercepting each access attempt, the filter driver may be configured to determine whether the attempt is to access a system file listed in the delta table, as in 430. If not, as indicated by the negative exit from 430, then the filter driver may allow access to the requested system file, as in 440. Further, if the system file is in the delta table, as indicated by the affirmative exit from 430, the filter driver may determine whether the virtualization system is in "dominant" or "subordinate" mode, as in 450. In some embodiments, the mode (dominant or subordinate) may be indicated by one or more values stored in compatibility option flags 319.

In some embodiments, dominant mode may indicate that access attempts to a system file should be serviced by a virtual version rather than a version on the base environment. Accordingly, if the filter driver determines that the system is in dominant mode, as indicated by the affirmative exit from 470, then it directs the access to use the system file in the virtual layer, as in 470. Otherwise, if the filter driver determines that the system is in subordinate mode, as indicated by the negative exit from 470, the filter driver directs the access to use the system file in the base environment, as in 460.

Figure 5:
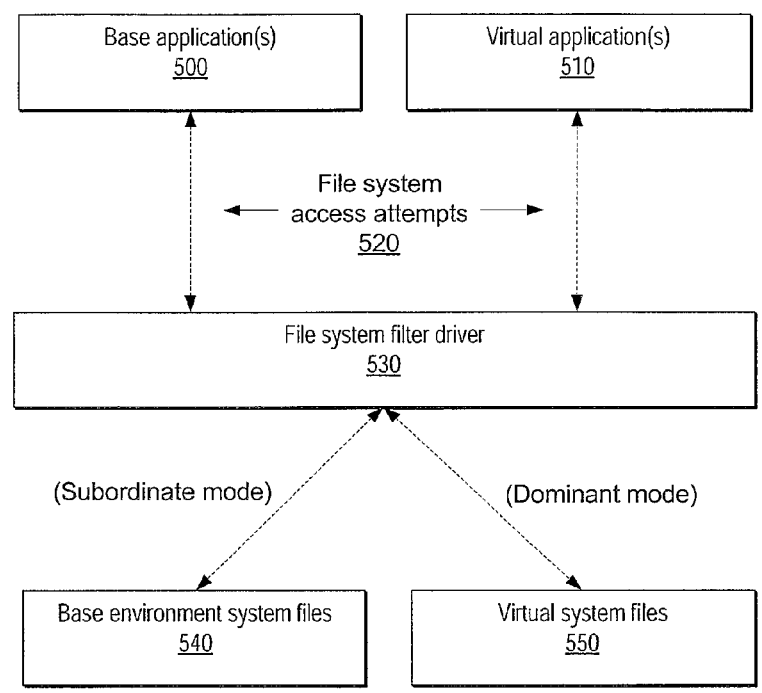
FIG. 5 is a block diagram illustrating the operation of a file system filter driver operating in base compatibility mode, according to some embodiments.

FIG. 5 is a block diagram illustrating the operation of a file system filter driver operating in base compatibility mode, according to some embodiments. According to the illustrated embodiment, base applications 500 (i.e., non-virtual applications installed on the base environment) and virtual applications 510 may each make file system access attempts 520 to access various system files and/or settings (e.g., DLLs, registry settings). File system access attempts 520 may be intercepted by file system filter driver 530. In various embodiments, filter driver 530 may correspond to filter driver 334 in FIG. 3. In response intercepting the access attempts, file system filter driver 530 may be configured to determine the compatibility verification mode (e.g., dominant or subordinate) and route the access attempts to the corresponding system files. For example, if the system is in dominant mode, then if an access attempt 520 is directed towards a system file that exists among both base environment system files 540 and among virtual system files 550, then file system filter driver 550 may direct the access to the virtual system file in 550. Conversely, if the system is in subordinate mode, then file system filter driver 550 may be configured to direct the access to the base environment system files 550 instead.

Thus, by setting the virtualization system to operate in compatibility mode, an administrator and/or other user may determine whether any software conflicts and/or other compatibility issues exist between the virtualized application and the base environment. For example, if an application of base environment malfunctions when the system is in dominant base compatibility mode, then this may be indicative of the application being incompatible with one or more virtual system files. According to embodiments, a user may detect such conflicts without the need to actually install the virtual application, which may permanently damage, modify, or replace various system files relied upon by one or more base applications.

Figure 6:
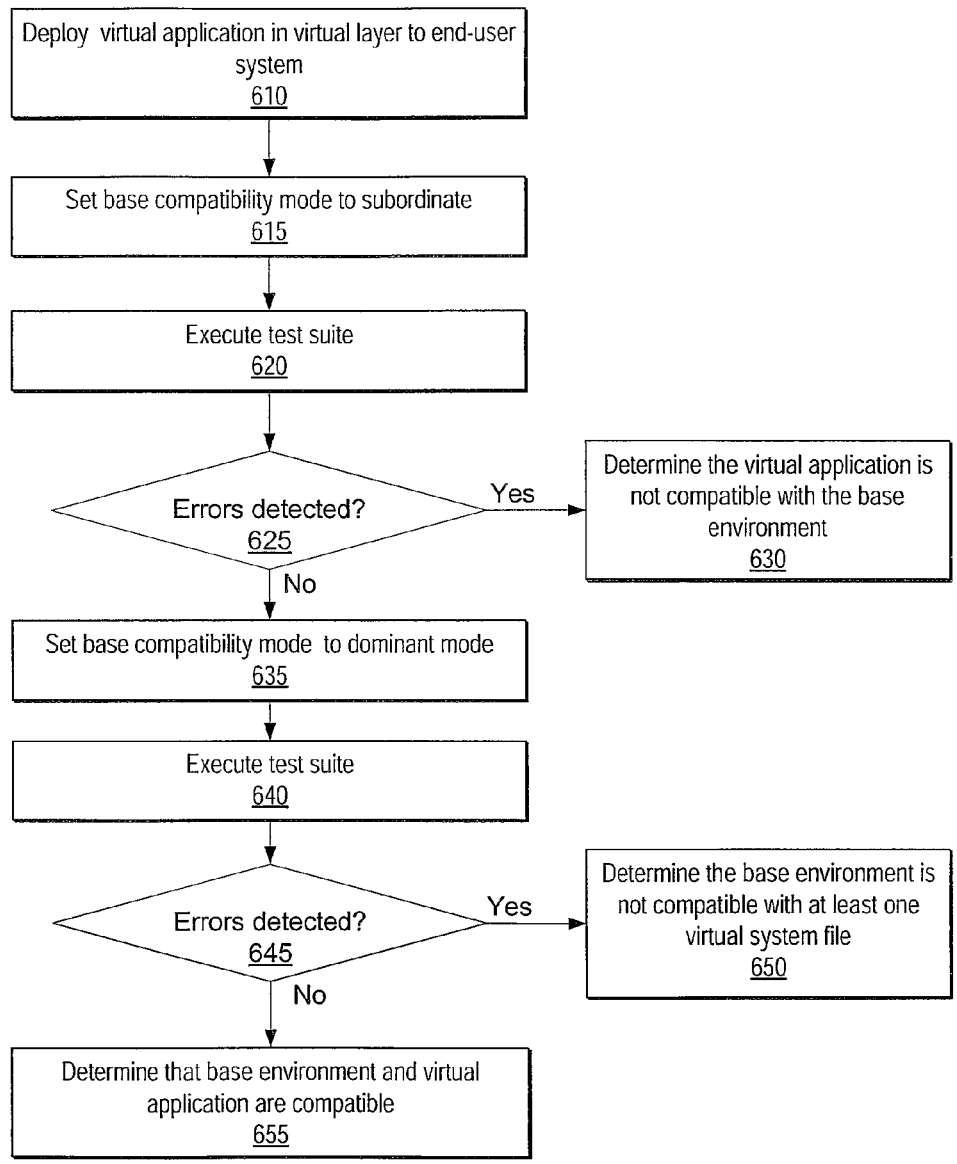
FIG. 6 is a flow diagram illustrating a method for determining the compatibility of an application with a base environment using virtualization, according to one embodiment.

FIG. 6 is a flow diagram illustrating a method for determining the compatibility of an application with a base environment using virtualization, according to one embodiment. In various embodiments, the illustrated method may be executed by any combination of base compatibility verification mechanisms 338, with or without user guidance. According to the illustrated embodiment, the method may begin by deploying a virtual application in a virtual software layer on an end-user system, as in 610. Once the virtual application is deployed, the method may comprise setting the base compatibility mode to subordinate mode, as in 615. In the illustrated embodiment, the example workflow tests for conflicts in subordinate mode before doing so in dominant mode. However, in various embodiments, a reversing of this order is also possible, as is performing conflict detection for only one of these modes.

According to the illustrated embodiment, a test suite and/or script may be executed to test the virtual application, as in 620. For example, in some embodiments, a test script may exercise the virtual application by invoking various functions and/or APIs of the virtual application. In other embodiments, a test suite may not be strictly necessary, but rather, a user may manually test the virtual application by using traditional manual topdown testing techniques, or other suitable test techniques.

In some embodiments, the file system filter driver may be configured to intercept each file system access attempt made by the virtual application while it is being exercised. Since the system is operating in subordinate base compatibility mode, if the virtual application attempts to access a system file for which both a virtual and base version exist, the filter driver may direct the access to use the version in the base environment. Thus, if any errors occur during the test, as indicated by the affirmative exit from 625, the system may determine that the virtual application is not compatible with the base environment, as in 630. That is, the virtual application may malfunction if it system files on which it relies are replaced with those on the base environment.

However, if no errors are detected, as indicated by the negative exit from 625, the method may comprise setting the base compatibility mode to dominant mode, as in 635, and then testing one or more of the applications installed on the base environment. For example, in some embodiments, this may include executing a test suite, as in 640, that exercises an array of applications and their functionality, as was done in 620 for the virtual application.

In addition to the above, if an error is detected during the test, as in the affirmative exit from 645, the system may determine that the base environment is not compatible with the virtual layer, as in 650. That is, at least one of the base environment applications tested malfunctions when using one or more virtual system files.

In some circumstances, an error in dominant mode (as indicated by the affirmative exit from 645) may be of particular interest for compatibility verification since migrating the virtual application to the base environment (e.g., installing the application on the base environment), may include copying some number of the virtual system files to the base environment, which may overwrite one or more of the base environment's system files. In some embodiments, the state of a system executing in dominant mode may reflect that of the system should the virtual application be installed. Therefore, an error in dominant mode may be of particular interest for predicting errors that may occur as a result of migrating a virtual application to the base system.

In various embodiments, in response to detecting an error, as in the affirmative exit from 625 and/or from 645, the system may be configured to record information about the error. For example, in some embodiments, the system may record information regarding the error into an error log that may be saved on the file system, in a database, and/or in any form of persistent storage (e.g., disk drives) that maintains contents beyond the lifespan of program execution. In various embodiments, the information may indicate the nature of the exception, the system files involved, the application(s) involved, a program stack trace, the identity of other applications that rely on the system file (if any), and/or other information that may be useful to the user in diagnosing the nature of the incompatibility. For example, if the virtual system files conflict only with one application on the base environment and that application is obsolete, an administrator may wish to install the virtual application on the base image despite the conflict. However, if the conflict is with an important application or with a plurality of applications on the base environment, then an administrator may wish to search for a different solution (e.g., leaving the virtual application in a virtual layer).

According to the illustrated embodiment, if errors are detected in neither 625 nor in 645, the system may determine that the base environment and virtual application are compatible, as in 655. In such a case, an administrator may wish to migrate the virtual application to the base environment, such as by executing an installer program or script on the base environment.

In addition to the above, one or more components of the virtualization system may facilitate virtual-to-base application migration without the need to manually execute an installer program. In such embodiments, a component of the virtualization system (e.g., base compatibility verification mechanisms 338 of FIG. 3), may be configured to install the application by copying various components from the virtual space to the base environment. For example, in some embodiments, installing a virtual application may include copying the application's executables, data files, configuration files, registry entries, and/or any other system files from the redirect area to respective locations in the base environment. In some embodiments, each file may be copied from the redirect area to the respective location in the file system that the filter driver had previously used as the virtual address for that file. For example, if the filter driver makes a given DLL of a virtual application, which resides in a redirect area while the application is virtual, appear to be in another target directory, then in some embodiments, migrating the application from a virtual layer to the base environment may include copying or moving the DLL from the redirect area to the target directory.

In some embodiments, in addition to determining compatibility between a virtual software layer and a base environment, the techniques described herein may also be applied to determining compatibility between a plurality of virtual software layers. For example, according to some embodiments, an administrator may set a combination of flags (e.g., in option flags 319 of system 300), to indicate that one virtual layer is dominant while one or more others are subordinate. Thus, the administrator may test whether the subordinate layers are compatible with the dominant layer.

In some embodiments, testing the compatibility of one or more virtual layers with another may involve a process similar to that of determining base compatibility, as described above. For example, in some embodiments, a file system driver may be configured to build one or more delta tables indicating the system file overlap between the dominant layer and each subordinate layer. In some embodiments, a file system filter driver (e.g., 334) may be configured to intercept system file access attempts made by one or more applications on each subordinate layer, to determine whether each access attempt is to a system file in the delta table, and if so, to route the access attempt to the system file version on the dominant layer.

Figure 7:
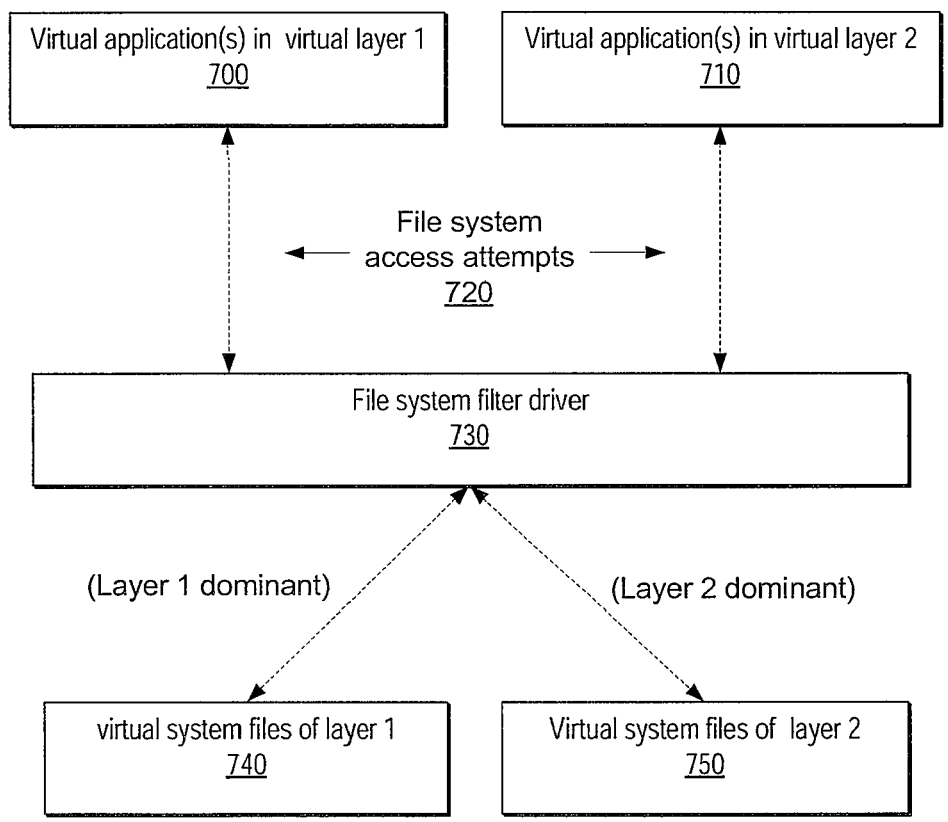
FIG. 7 is a block diagram illustrating the operation of a system configured to determine compatibility between multiple virtual software layers, according to some embodiments.

FIG. 7 is a block diagram illustrating the operation of a system configured to determine compatibility between multiple virtual software layers, according to some embodiments. In the illustrated embodiment, one or more virtual applications in virtual layer 1 and 2 (e.g., 700 and 710 respectively) may each attempt file system accesses 720. In the illustrated embodiment, file system filter driver 730 may be configured to intercept access attempts 720 and to determine whether each is attempting to access a system file listed in a delta table. In some embodiments, a file may be listed in a delta table if a different version of the file exists in the dominant layer. According to the illustrated embodiment, if the access attempt is to a system file in the delta table, the access is serviced by the version in the dominant layer. For example, if layer 1 is dominant, filter driver 730 may rout access attempts 720 to the virtual system files 740 of layer 1, as indicated. Otherwise, if layer 2 is dominant, filter driver 730 may rout access attempts 720 to the virtual system files 740 of layer 2.

Using the above-described technique any number of applications in any number of virtual software layers may be tested for compatibility with another virtual software layer. In some embodiments, virtual-virtual and virtual-base compatibility may be combined. For example, in some embodiments, when a given virtual layer is in dominant mode, a delta table may be built for applications in the base environment and for those in other layers. In some embodiments, access attempts from both virtual and base applications may be intercepted and potentially routed to system file versions of the dominant virtual layer. Alternatively, in some embodiments, multiple virtual layers may be insubordinate mode concurrently while the base environment is in dominant mode. In such instances, access attempts from applications on the subordinate virtual layers may be serviced by (e.g., routed to) analogous versions of respective files in the base environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computer-implemented method, comprising:
   determining a set of files of a plurality of files stored on a computer system, wherein for each file in the set, a second version of the file exists in a virtual software layer of the computer system;
   intercepting an access attempt from an application on the computer system to a first file on the computer system;
   determining a first compatibility checking mode;
   determining that a second version of the first file on the computer system exists in the virtual software layer, wherein determining that the second version of the first file on the computer system exists comprises determining that the second version of the first file is a member of the set, and wherein the second version of the first file has a same name as the first file; and
   in response to said intercepting, said determining the first compatibility mode, and said determining that a second version of the system file exists, attempting to perform the access using the second version of the file.

2. The computer-implemented method of claim 1, wherein a file system path of the file is the same as a virtual path of the second version of the file.

3. The computer-implemented method of claim 1, wherein the application exists in a second virtual software layer distinct from the virtual software layer.

4. The computer-implemented method of claim 1, further comprising: detecting that said attempting to perform the access failed, and in response to said detecting, recording an indication of the failure in an error log in a persistent storage space.

5. The computer-implemented method of claim 1, wherein the access attempt is performed by an automated test program configured to exercise a broad range of functionality provided by the application.

6. The computer implemented method of claim 1, further comprising: overwriting the first file with the second version of the first file.

7. The computer-implemented method of claim 1, further comprising:
   intercepting an access attempt from an application deployed in the virtual software layer to the second version of the first file on the computer system;
   determining a second compatibility checking mode;
   determining that the second version of the first file exists outside of the virtual software layer;
   in response to said intercepting the attempt from the application deployed in the virtual software layer, said determining the second compatibility mode, and said determining that a second version of the system file exists outside of the virtual software layer, attempting to perform the access using the file.

8. A non-transitory computer-readable storage medium storing program instructions executable by a computer processor to perform:
- determining a set of files of a plurality of files stored on a computer system, wherein for each file in the set, a second version of the file exists in a virtual software layer of the computer system;
- intercepting an access attempt from an application on the computer system to a first file on the computer system;
- determining a first compatibility checking mode;
- determining that a second version of the first file on the computer system exists in the virtual software layer, wherein determining that the second version of the first file on the computer system exists comprises determining that the second version of the first file is a member of the set, and wherein the second version of the first file has a same name as the first file; and
- in response to said intercepting, said determining the first compatibility mode, and said determining that a second version of the system file exists, attempting to perform the access using the second version of the file.

9. The computer-readable storage medium of claim 8, wherein a file system path of the file is the same as a virtual path of the second version of the file.

10. The computer-readable storage medium of claim 8, wherein the application exists in a second virtual software layer distinct from the virtual software layer.

11. The computer-readable storage medium of claim 8, wherein the program instructions are further executable to implement: detecting that said attempting to perform the access failed, and in response to said detecting, recording an indication of the failure in an error log in a persistent storage space.

12. The computer-readable storage medium of claim 8, wherein the access attempt is performed by an automated test program configured to exercise a broad range of functionality provided by the application.

13. The computer-readable storage medium of claim 8, wherein the program instructions are further executable to implement: overwriting the first file with the second version of the first file.

14. The computer-readable storage medium of claim 8, wherein the program instructions are further executable to implement:
- intercepting an access attempt from an application deployed in the virtual software layer to the second version of the first file on the computer system;
- determining a second compatibility checking mode;
- determining that the second version of the first file exists outside of the virtual software layer;
- in response to said intercepting the attempt from the application deployed in the virtual software layer, said determining the second compatibility mode, and said determining that a second version of the system file exists outside of the virtual software layer, attempting to perform the access using the file.

15. A system comprising:
one or more processors;
a memory coupled to the one or more processors, wherein the memory stores program instructions executable to implement:
- a software virtualization system configured to support operation of a virtual software application in a virtual software layer;
- a file system filter driver configured to intercept file system access attempts from the virtual software application and from another application not in the virtual software layer to respective system files;
- wherein the file system driver is configured to determine a set of files of a plurality of files stored on the system, wherein for each file in the set, a second version of the file exists in the virtual software layer;
- wherein the file system driver is configured to determine that a second version of a first file on the computer system exists in the virtual software layer, responsive to determining that the second version of the first file is a member of the set, and wherein the second version of the first file has a same name as the first file; and
- wherein in a first mode of operation, the file system filter driver is configured to route an intercepted access attempt to the first file; and
- wherein in a second mode of operation, the file system filter driver is configured to route the intercepted access attempt to the second file.

16. The system of claim 15, wherein the another application is in another virtual software layer, distinct from the virtual software layer.

17. The system of claim 15, wherein the file system filter is further configured detect whether one of the access attempts failed and in response, to record an indication of the failure in an error log in a persistent storage space.

18. The system of claim 15, wherein the program instructions are further executable to implement a testing module configured to exercise a broad range of functionality provided by the software application or by the virtual software application, wherein said exercising generates one or more of the access events.

* * * * *